United States Patent
Kim et al.

(10) Patent No.: US 8,019,300 B2
(45) Date of Patent: Sep. 13, 2011

(54) MULTI-CHANNEL TUNING RECEIVER AND MULTI-CHANNEL TUNING METHOD THEREOF

(75) Inventors: Yang Su Kim, Daejeon (KR); Han Seung Koo, Daejeon (KR); Doh-Wook Kim, Daejeon (KR); Yun Jeong Song, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 479 days.

(21) Appl. No.: 12/273,176

(22) Filed: Nov. 18, 2008

(65) Prior Publication Data
US 2009/0141833 A1      Jun. 4, 2009

(30) Foreign Application Priority Data

Dec. 3, 2007      (KR) ...................... 10-2007-0124227

(51) Int. Cl.
*H04B 1/18*      (2006.01)
*H04B 17/02*      (2006.01)
(52) U.S. Cl. .................. 455/179.1; 455/137; 455/191.1
(58) Field of Classification Search ............... 455/179.1, 455/187.1, 137, 178.1, 191.1
See application file for complete search history.

(56) References Cited

U.S. PATENT DOCUMENTS

| | | | |
|---|---|---|---|
| 6,128,479 A * | 10/2000 | Fitzpatrick et al. | 455/137 |
| 6,931,241 B2 * | 8/2005 | Khlat et al. | 455/137 |
| 7,907,922 B2 * | 3/2011 | Lee et al. | 455/130 |
| 2004/0163219 A1 | 8/2004 | Wu et al. | |
| 2005/0010958 A1 | 1/2005 | Rakib et al. | |

FOREIGN PATENT DOCUMENTS

| | | |
|---|---|---|
| JP | 2003-087767 A | 3/2003 |
| KR | 1020030027687 A | 4/2003 |
| KR | 2007-0039379 A | 4/2007 |

* cited by examiner

*Primary Examiner* — Hai L Nguyen
(74) *Attorney, Agent, or Firm* — Ladas & Parry LLP

(57) ABSTRACT

Provided are a multi-channel tuning receiver, including: a broadband radio frequency (RF) tuner to receive a broadband signal, divide the broadband signal into a plurality of signals, tune the divided signals, combine the tuned signals into a single signal, and output the combined single signal; an analog-to-digital (A/D) converter to convert the combined single signal to digital signal; a channelizer to extract only a bonded channel from the digital signal; and a plurality of demodulators to demodulate the bonded channel, and a multi-channel tuning method thereof.

13 Claims, 7 Drawing Sheets

MULTI-CHANNEL TUNING RECEIVER AND MULTI-CHANNEL TUNING METHOD THEREOF

CROSS-REFERENCE TO RELATED APPLICATION

This application claims priority from Korean Patent Application No. 10-2007-0124227, filed on Dec. 3, 2007, in the Korean Intellectual Property Office, the entire disclosure of which is incorporated herein by reference.

BACKGROUND OF THE INVENTION

1. Field of the Invention

The present invention relates to a multi-channel tuning receiver and a multi-channel tuning method thereof, and more particularly, to a multi-channel tuning receiver that can receive a plurality of independent channels, separate the plurality of independent channels from each other by a channel bandwidth of each independent channel based on a central frequency and thereby can combine the plurality of independent channels into a single signal.

This work was supported by the IT R&D program of MIC/IITA. [2006-S-019-02, The Development of Digital Cable Transmission and Receive System for 1 Gbps Downstream]

2. Description of Related Art

Cable modems of standards less than Data Over Cable Service Interface Specifications (DOCSIS) 2.0 receives a signal of 54 MHz through 864 MHz from a Hybrid Fiber Coax (HFC) network to reduce the band of the signal to an intermediate frequency (IF) bandwidth, generally 44 MHz, using a radio frequency (RF) tuner, tune the signal, and perform digital demodulation for the tuned signal of 6 MHz. However, in cable modems of standards greater than DOCSIS 3.0, a physical layer protocol (PHY) should simultaneously receive a signal that is bonded with at least four channels, convert the received signal into a digital signal, and then transfer the digital signal to a Media Access Control (MAC) module.

FIG. 1 is a block diagram illustrating the structure of a receiver 100 for receiving a single channel according to a conventional art. Referring to FIG. 1, the receiver 100 includes an RF tuner 102, an analog-to-digital (A/D) converter 104, and a demodulator 106.

The RF tuner 102 may receive, tune, and output an RF signal from the HFC network. The A/D converter 104 may receive a tuned analog signal from the RF tuner 102, convert the analog signal to a digital signal, and output the digital signal. The demodulator 106 may receive the digital signal from the A/D converter 104 and the digital signal.

The receiver 100 may process only the single channel. Accordingly, in order to receive multiple channels, a plurality of receivers constructed as above should be connected in parallel and thereby be used.

When using the parallel-connected receivers for receiving the single channel, an analog signal is converted to a digital signal for each channel. Therefore, a plurality of A/D converts should be used in order to receive multiple channels.

SUMMARY OF THE INVENTION

An aspect of the present invention provides a multi-channel tuning receiver and a multi-channel tuning method thereof.

Another aspect of the present invention also provides a multi-channel tuning receiver that can receive a plurality of independent channels, separate the plurality of independent channels from each other by a channel bandwidth of each independent channel based on a central frequency, and combine the plurality of independent channels into a single signal, and a multi-channel tuning method thereof.

Another aspect of the present invention also provides a multi-channel tuning receiver that can receive multiple channels and convert the multiple channels to a digital signal using a single analog-to-digital (A/D) converter, and a multi-channel tuning method thereof.

Another aspect of the present invention also provides a multi-channel tuning receiver with a plurality of radio frequency (RF) tuners that can receive multiple channels, combine the multiple channels into a single signal, and convert the combined single signal to a digital signal using a single A/D converter, and a multi-channel tuning method thereof.

The present invention is not limited to the above purposes and other purposes not described herein will be apparent to those of skill in the art from the following description.

According to an aspect of the present invention, there is provided a multi-channel tuning receiver including: a broadband RF tuner to receive a broadband signal, divide the broadband signal into a plurality of signals, tune the divided signals, combine the tuned signals into a single signal, and output the combined single signal; an A/D converter to convert the combined single signal to digital signal; a channelizer to extract only a bonded channel from the digital signal; and a plurality of demodulators to demodulate the bonded channel.

According to another aspect of the present invention, there is provided a multi-channel tuning method of a multi-channel tuning receiver, the method including: receiving a broadband signal to divide the broadband signal into a plurality of signals; tuning the divided signals; combining the tuned signals into a single signal; converting the combined signal to a digital signal; extracting only a bonded channel from the digital signal; and demodulating the bonded channel.

Additional aspects, features, and/or advantages of the invention will be set forth in part in the description which follows and, in part, will be apparent from the description, or may be learned by practice of the invention.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
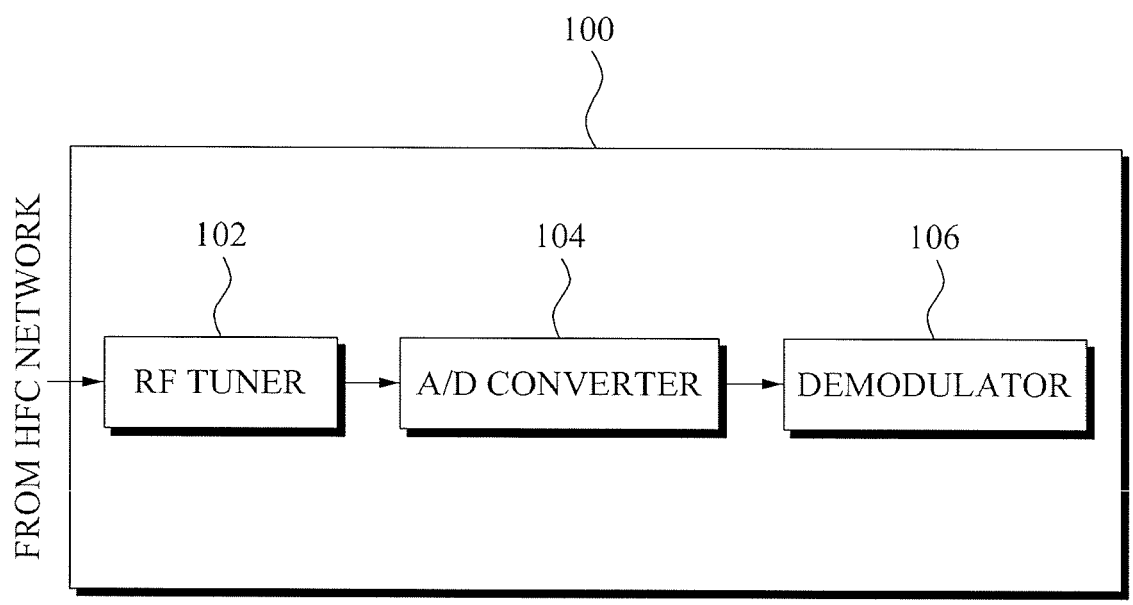
FIG. 1 is a block diagram illustrating the structure of a receiver for receiving a single channel according to a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

According to the present invention, there is provided a multi-channel tuning receiver with a plurality of radio frequency (RF) tuners that can receive a plurality of independent channels, separate the plurality of independent channels from each other by a channel bandwidth of each independent channel based on a single central frequency, combine the plurality of independent channels into a single signal, and convert the single signal to a digital signal using a single analog-to-digital (A/D) converter, and a multi-channel tuning method thereof. Hereinafter, it will be described with reference to FIG. 2.

Figure 2:
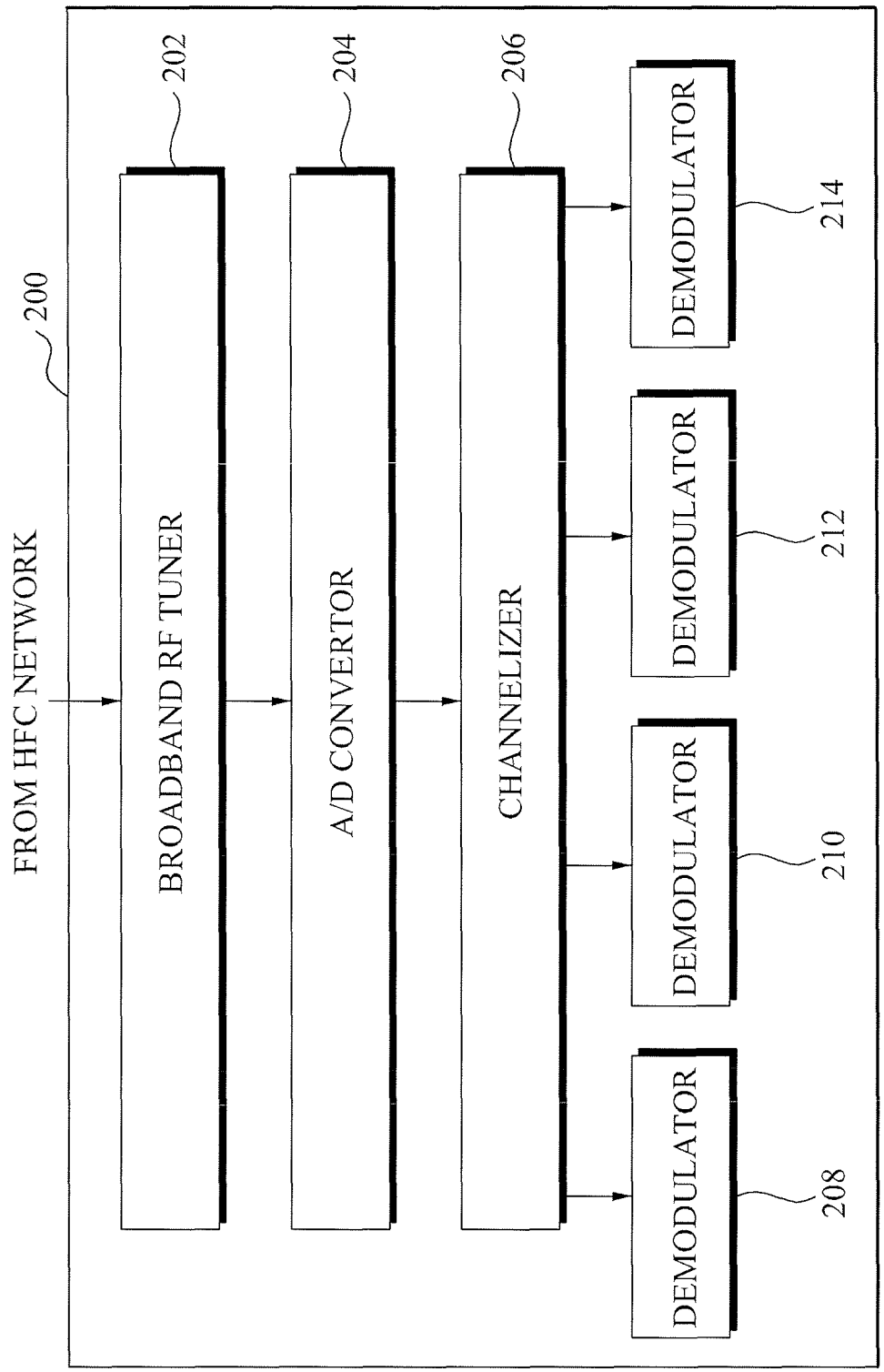
FIG. 2 is a block diagram illustrating a configuration of a multi-channel tuning receiver according to an exemplary embodiment of the present invention.

FIG. 2 is a block diagram illustrating a configuration of a multi-channel tuning receiver 200 according to an exemplary embodiment of the present invention. Referring to FIG. 2, the multi-channel tuning receiver 200 includes a broadband RF tuner 202, an A/D converter 204, a channelizer 206, and four demodulators 208, 210, 212, and 214.

The broadband RF tuner 201 may receive, from a Hybrid Fiber Coax (HFC) network, a broadband signal that is bonded with a plurality of channels, separate the bonded channels in the broadband signal, tune the separated channels using a plurality of RF tuners, separate the tuned channels from each other by a predetermined channel bandwidth of each channel based on a central frequency, combine the channels into a single signal, and output the combined single signal. The broadband RF tuner 202 will be described in detail later with reference to FIG. 3.

The A/D converter 204 may convert a tuned signal, output from the broadband RF tuner, to a digital signal. The channelizer 206 may select only bonded channels from the digital signal, and output the bonded channels to the demodulators 208, 210, 212, and 214 respectively. Each of the demodulators 208, 210, 212, and 214 may demodulate the tuned signal for each bonded channel that is provided from the channelizer 206.

Figure 3:
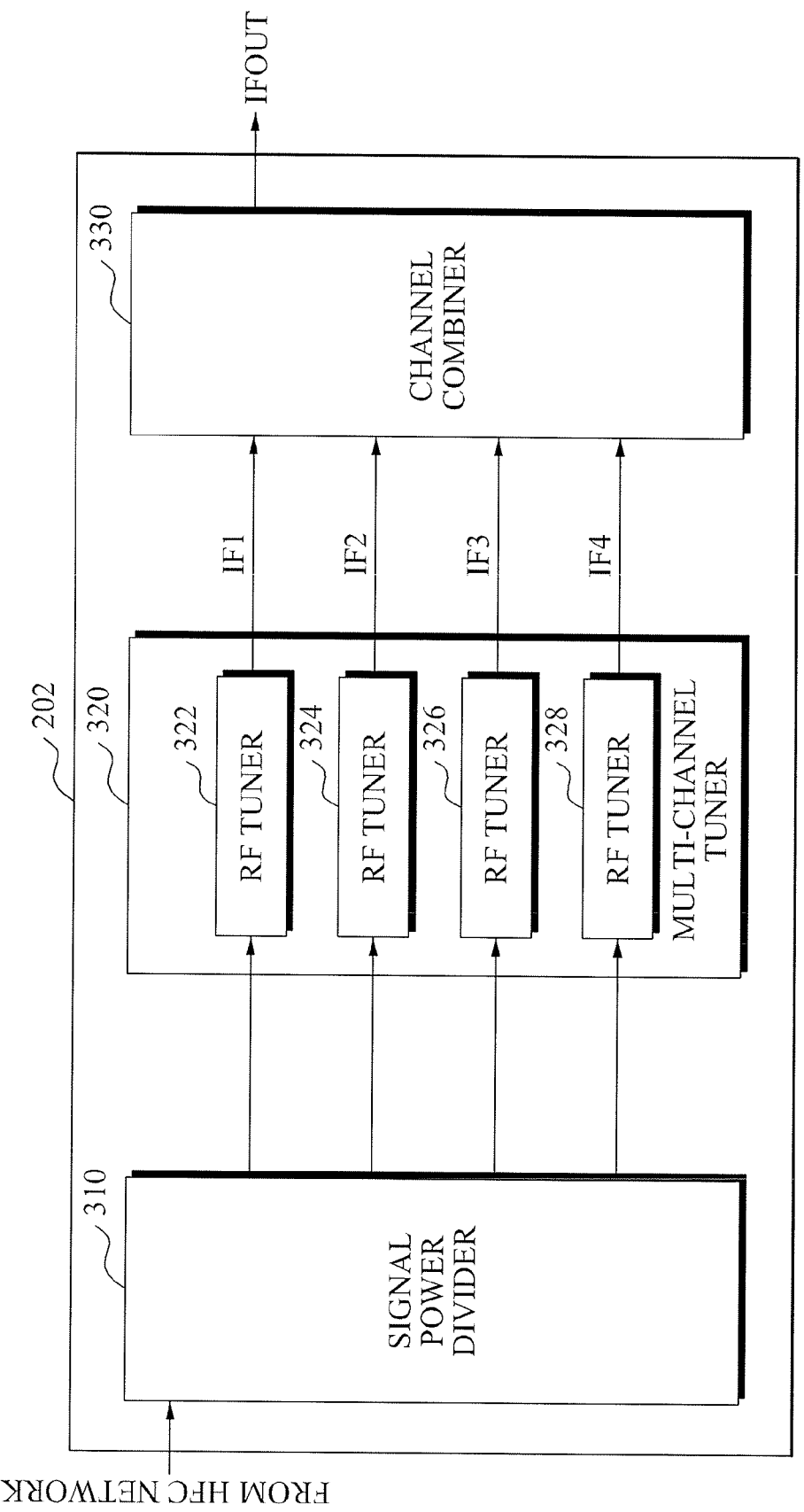
FIG. 3 is a block diagram illustrating a configuration of a broadband radio frequency (RF) tuner of a multi-channel tuning receiver according to an exemplary embodiment of the present invention.

FIG. 3 is a block diagram illustrating a configuration of the broadband RF tuner 202 of the multi-channel tuning receiver according to an exemplary embodiment of the present invention. Referring to FIG. 3, the broadband RF tuner 202 includes a signal power divider 310, a multi-channel tuner 320, and a channel combiner 330. The multi-channel tuner 320 may include a plurality of RF tuners 322, 324, 326, and 328.

The signal power divider 310 may divide a broadband signal, received from an HFC network, into the same number of signals as a number of bonded signals and provide the divided signals to the RF tuners 322, 324, 326, and 328 respectively. The signal power divider 310 will be further described in detail with reference to FIG. 4.

The multi-channel tuner 320 includes the plurality of RF tuners 322, 324, 326, and 328. The multi-channel tuner 320 may receive the divided signals that are bonded with channels respectively from the signal power divider 310, tune each of the signals, combine the signals into a single signal and output the combined signal as an intermediate frequency (IF) band signal. Output frequencies of the RF tuners 322, 324, 326, and 328 may be output to not overlap each other and to be separated from each other by a channel bandwidth based on a central frequency.

When receiving a plurality of tuned channel signals of the IF band from the multi-channel tuner 320, the channel combiner 330 may synthesize channels based on the central frequency to generate a single output signal in which a plurality of channels is synthesized and to output the generated single output signal. The channel combiner 330 will be further described in detail with reference to FIG. 5.

Figure 4:
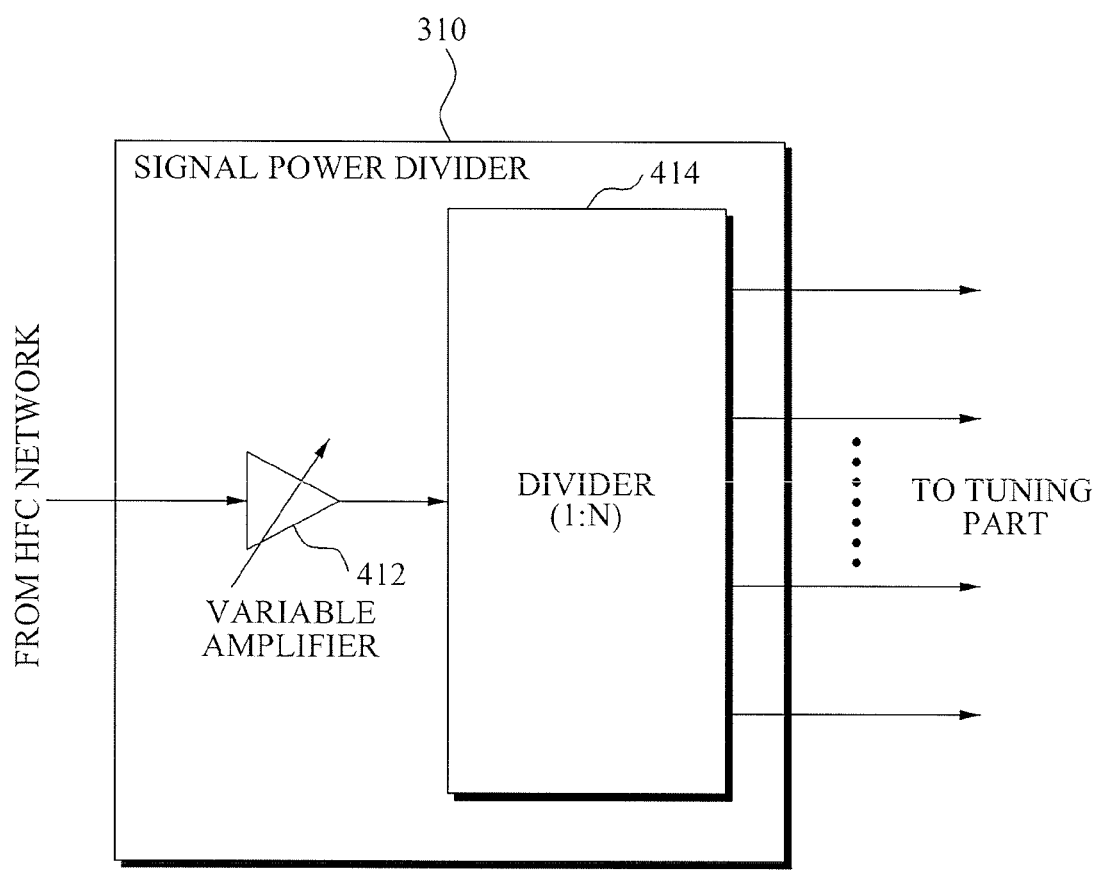
FIG. 4 illustrates a configuration of a signal power divider of a broadband RF tuner according to an exemplary embodiment of the present invention.

FIG. 4 illustrates a configuration of the signal power divider 310 of the broadband RF tuner 202 according to an exemplary embodiment of the present invention. Referring to FIG. 4, the signal power divider 310 includes a variable amplifier 412 and a divider 414.

The divider 312 may divide a signal, received from an HFC network, based on a division ratio corresponding to a number of bonded channels of the signal and output the divided signals. The division ratio is the number of bonded channels and is the same as the number of RF tuners 322, 324, 326, and 328 that are included in the multi-channel tuner 320.

The variable amplifier 412 may amplify a broadband signal and provide the amplified broadband signal to the divider 312 in order to correct the signal power level of the divider 312 that is output according to the division ratio.

Figure 5:
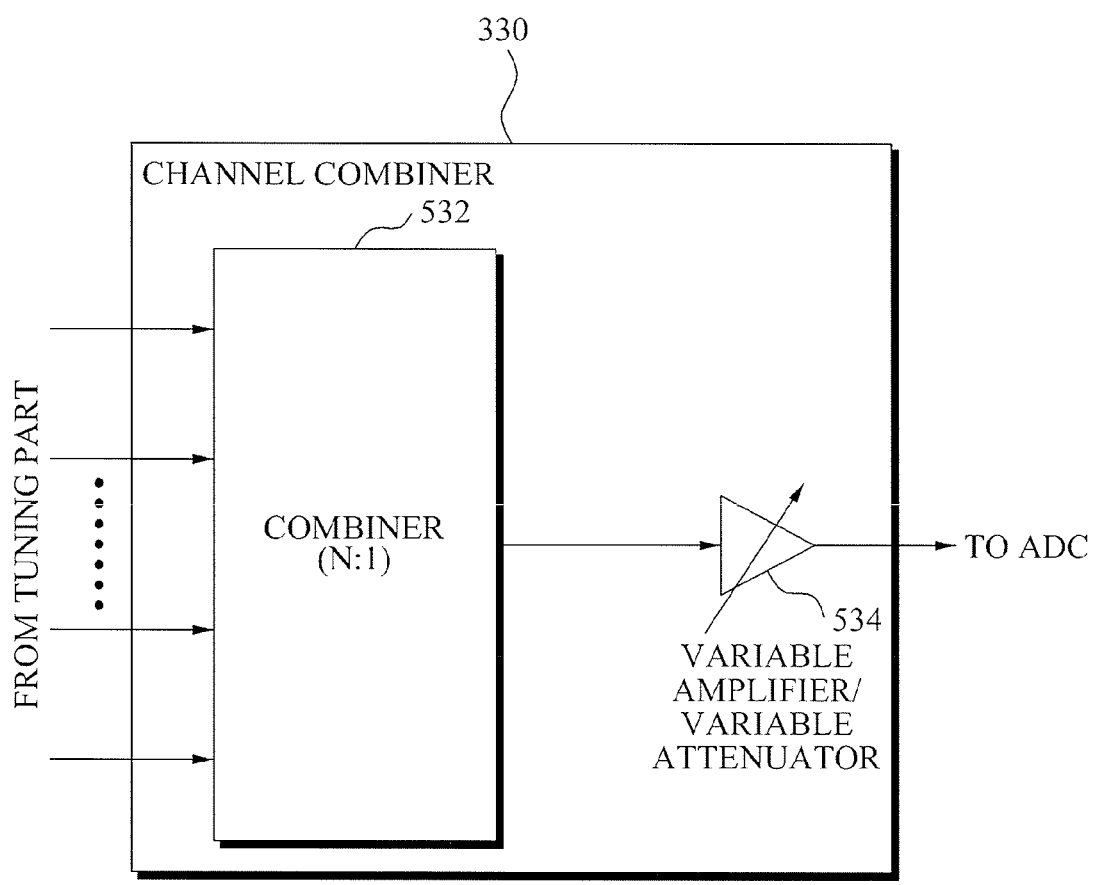
FIG. 5 illustrates a configuration of a channel combiner of a broadband RF tuner according to an exemplary embodiment of the present invention.

FIG. 5 illustrates a configuration of the channel combiner 330 of the broadband RF tuner 202 according to an exemplary embodiment of the present invention. Referring to FIG. 5, the channel combiner 330 includes a combiner 532 and a variable amplifier/variable attenuator 534.

The combiner 532 may combine signals received from the multi-channel tuner 320 into a single signal. A number of signals to be combined in the combiner 532 may be the same as the number of RF tuners 322, 324, 326, and 328 that are included in the multi-channel tuner 320 and may also be the number of channels that are bonded to the received broadband signal.

The variable amplifier/variable attenuator 534 may adjust the signal power level to a predetermined level by amplifying or reducing the signal power level. The signal power level may change according to a combination rate of the combiner 532.

Figure 6:
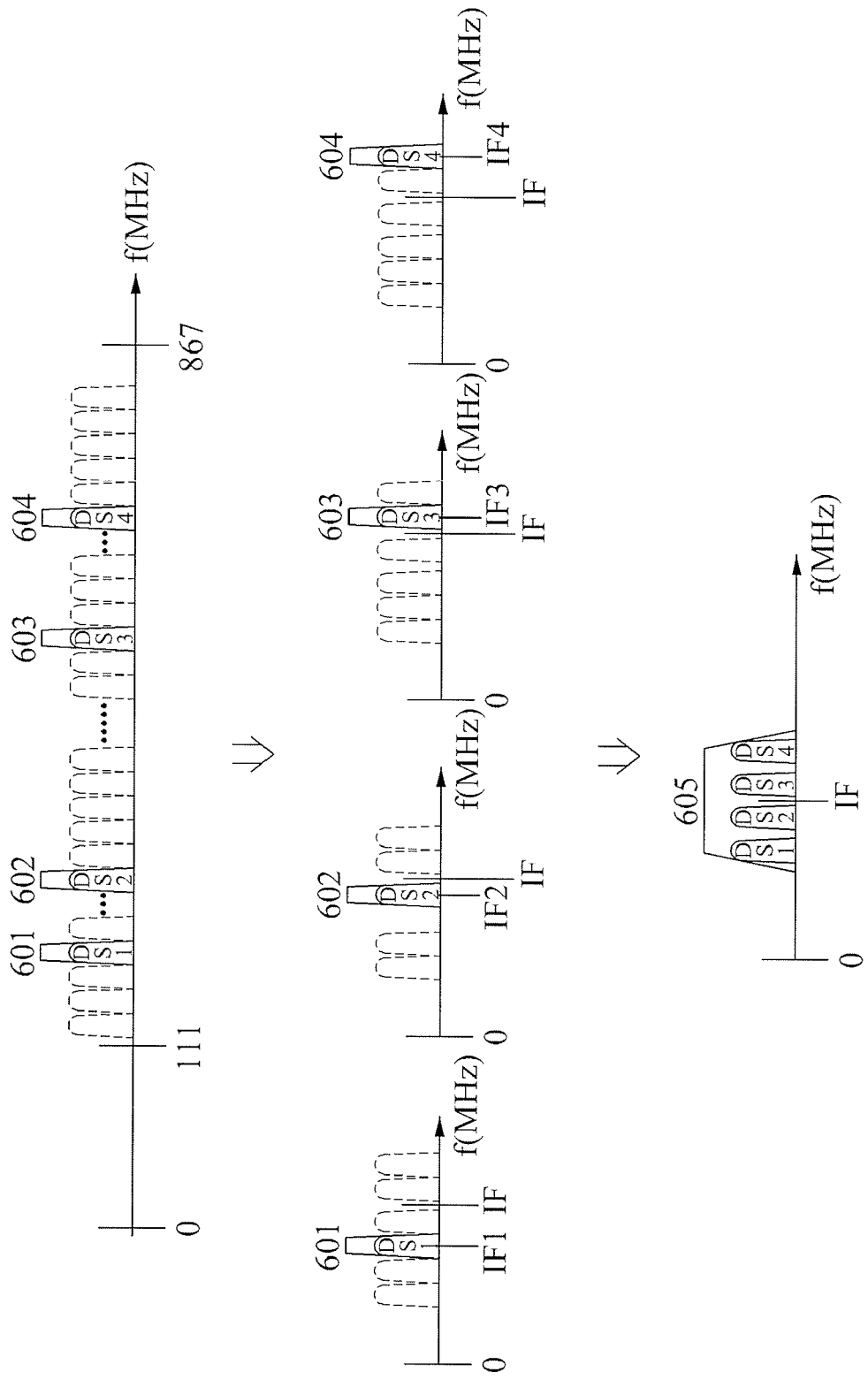
FIG. 6 illustrates a process of processing a signal by a multi-channel tuning receiver according to an exemplary embodiment of the present invention.

FIG. 6 illustrates a process of processing a signal by a multi-channel tuning receiver according to an exemplary embodiment of the present invention. An upper portion of FIG. 6 shows a broadband signal that is received by the broadband RF tuner 202. An intermediate portion of FIG. 6 shows channel signals that are tuned by the RF tuners 322, 324, 326, and 328. A lower portion of FIG. 6 shows a signal that is combined by the channel combiner 330 to be input into the A/D converter 204.

Referring to FIG. 6, when the multi-channel tuning receiver receives a broadband signal of 100 MHz through 867 MHz that is bonded with four channels 601, 602, 603, and 604, the RF tuners 322, 324, 326, and 328 may receive the divided bonded channels respectively, tune the received bonded channels, respectively, and output channel signals of an IF band with the level of 6 MHz as shown in part (b). The channel combiner 330 may combine the channel signals 601, 602, 603, and 604, shown in part (b), corresponding to outputs of the RF tuners 322, 324, 326, and 328 into a single signal 605, generate the signal 605 of 24 MHz based on a central frequency, and output the generated signal 605 to the A/D converter 204.

Figure 7:
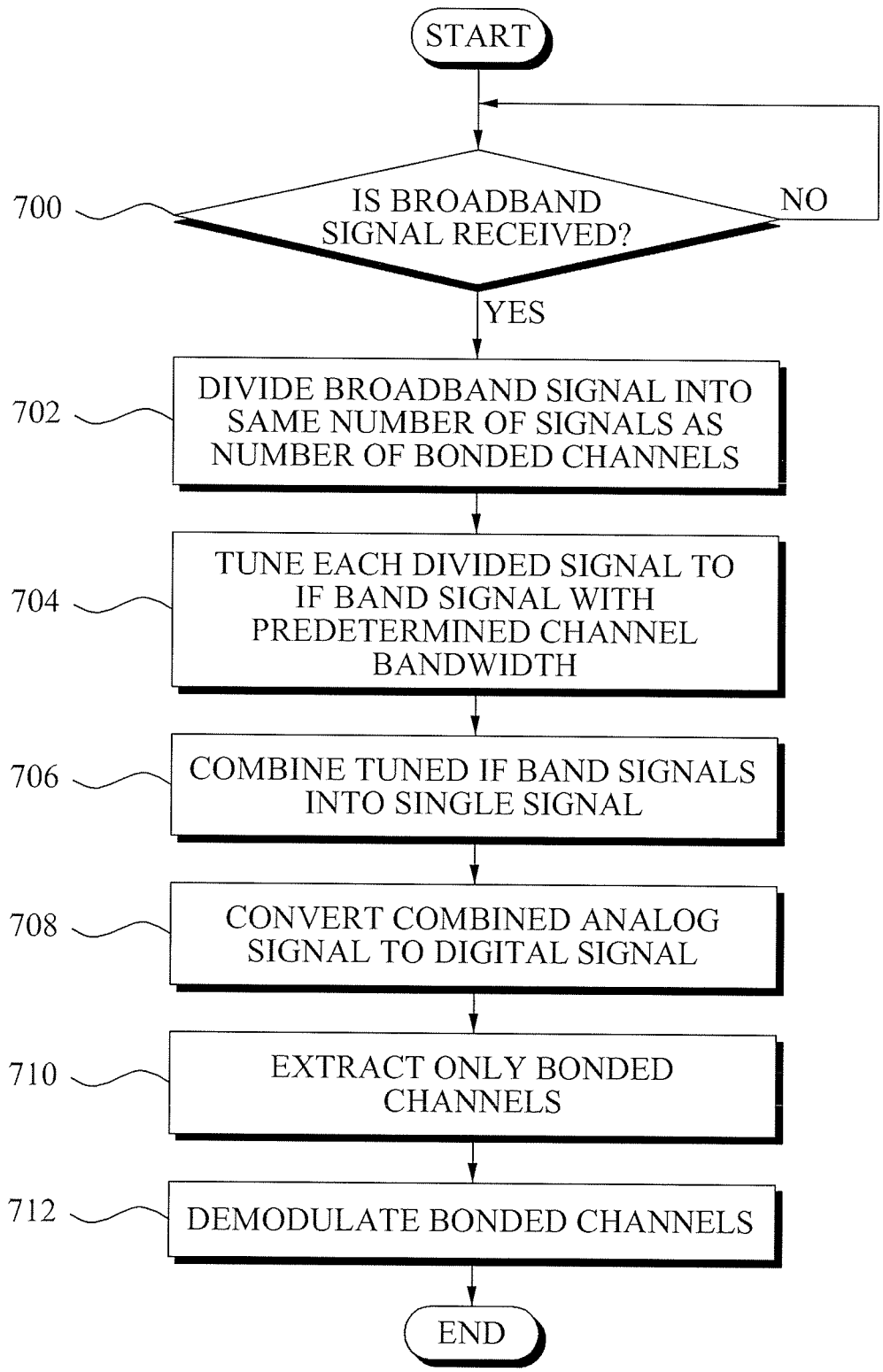
FIG. 7 is a flowchart illustrating a multi-channel tuning method according to an exemplary embodiment of the present invention.

Hereinafter, a multi-channel tuning method of a multi-channel tuning receiver constructed as above will be described. FIG. 7 is a flowchart illustrating a multi-channel tuning method according to an exemplary embodiment of the present invention.

Referring to FIG. 7, in operation 700, it is determined whether the multi-channel tuning receiver receives a broadband signal that is bonded with a plurality of channels. In operation 702, when the broadband signal is received, the multi-channel tuning receiver may divide the broadband signal into the same number of signals as a number of bonded channels. In operation 704, the multi-channel tuning receiver may tune each of the divided signals to an IF band signal with a predetermined channel bandwidth. The tuned signals may be set to not overlap each other and to be separated from each other by the channel bandwidth based on the central frequency.

In operation 706, the multi-channel tuning receiver may combine the tuned IF band signals into a single signal. In operation 708, the multi-channel tuning receiver may convert the combined analog signal to a digital signal. In operation 710, the multi-channel tuning receiver may extract only the bonded channels from the digital signal. In operation 712, the multi-channel tuning receiver may demodulate each of the extracted bonded channels.

As described above, according to the present invention, there may be provided a multi-channel tuning receiver including: a broadband RF tuner to receive a broadband signal, divide the broadband signal into a plurality of signals, tune the divided signals, combine the tuned signals into a single signal, and output the combined single signal; an A/D converter to convert the combined single signal to digital signal; a channelizer to extract only a bonded channel from the digital signal; and a plurality of demodulators to demodulate the bonded channel, and a multi-channel tuning method thereof. Through this, it is possible to perform digitalization using a single A/D converter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A multi-channel tuning receiver, comprising:
a broadband radio frequency (RF) tuner to receive a broadband signal, divide the broadband signal into a plurality of signals, tune the divided signals, combine the tuned signals into a single signal, and output the combined single signal;
an analog-to-digital (A/D) converter to convert the combined single signal to digital signal;
a channelizer to extract only a bonded channel from the digital signal; and
a plurality of demodulators to demodulate the bonded channel.

2. The receiver of claim 1, wherein the broadband RF tuner receives the broadband signal, divides the broadband signal into the same number of signals as a number of bonded channels, tunes the divided signals, combines and outputs the tuned signals to not overlap each other and to be separated from each other by a channel bandwidth, based on a central frequency.

3. The receiver of claim 1, wherein the broadband RF tuner comprises:
a signal power divider to divide the broadband signal into the plurality of signals;
a plurality of RF tuners to tune the divided signals respectively; and
a channel combiner to combine the tuned signals into a single signal.

4. The receiver of claim 3, wherein the signal power divider divides the broadband signal into the same number of signals as a number of bonded channels.

5. The receiver of claim 3, wherein a number of RF tuners is the same as a number of channels that are bonded to the broadband signal.

6. The receiver of claim 3, wherein, when the output signals are combined, the plurality of RF tuners is set to tune output signals of the RF tuners to not overlap each other and to be separated from each other by a channel bandwidth, based on a central frequency.

7. The receiver of claim 3, wherein the signal power divider comprises:
a variable amplifier to amplify the received broadband signal prior to the dividing of the broadband signal; and
a divider to divide the amplified broadband signal into the same number of signals as a number of bonded channels and output the divided signals.

8. The receiver of claim 3, wherein the channel combiner comprises:
a combiner to combine signals, received from the plurality of RF tuners, into a single signal; and
a variable amplifier/variable attenuator to adjust the signal power level, changing due to the combining of the combiner, to a predetermined level by amplifying or reducing the signal power level.

9. A multi-channel tuning method of a multi-channel tuning receiver, the method comprising:
receiving a broadband signal to divide the broadband signal into a plurality of signals;
tuning the divided signals;
combining the tuned signals into a single signal;
converting the combined signal to a digital signal;
extracting only a bonded channel from the digital signal; and
demodulating the bonded channel.

10. The method of claim 9, wherein the receiving of the broadband signal divides the broadband signal into the same number of signals as a number of bonded channels.

11. The method of claim 9, wherein, when the tuned signals are combined, the tuning of the divided signals sets the tuned signals to not overlap each other and to be separated from each other by a channel bandwidth, based on a central frequency.

12. The method of claim 9, further comprising:
amplifying the broadband signal based on a division ratio of the broadband signal prior to the receiving of the broadband signal and the dividing of the broadband signal.

13. The method of claim 9, further comprising:
adjusting the signal power level, changing due to the combining, to a predetermined level by amplifying or reducing the signal power level, after the combining of the tuned signals.

* * * * *